April 30, 1963
O. G. OSWOLD
3,087,318
MULTIFLASH DEVICE
Filed Feb. 13, 1961
2 Sheets-Sheet 1
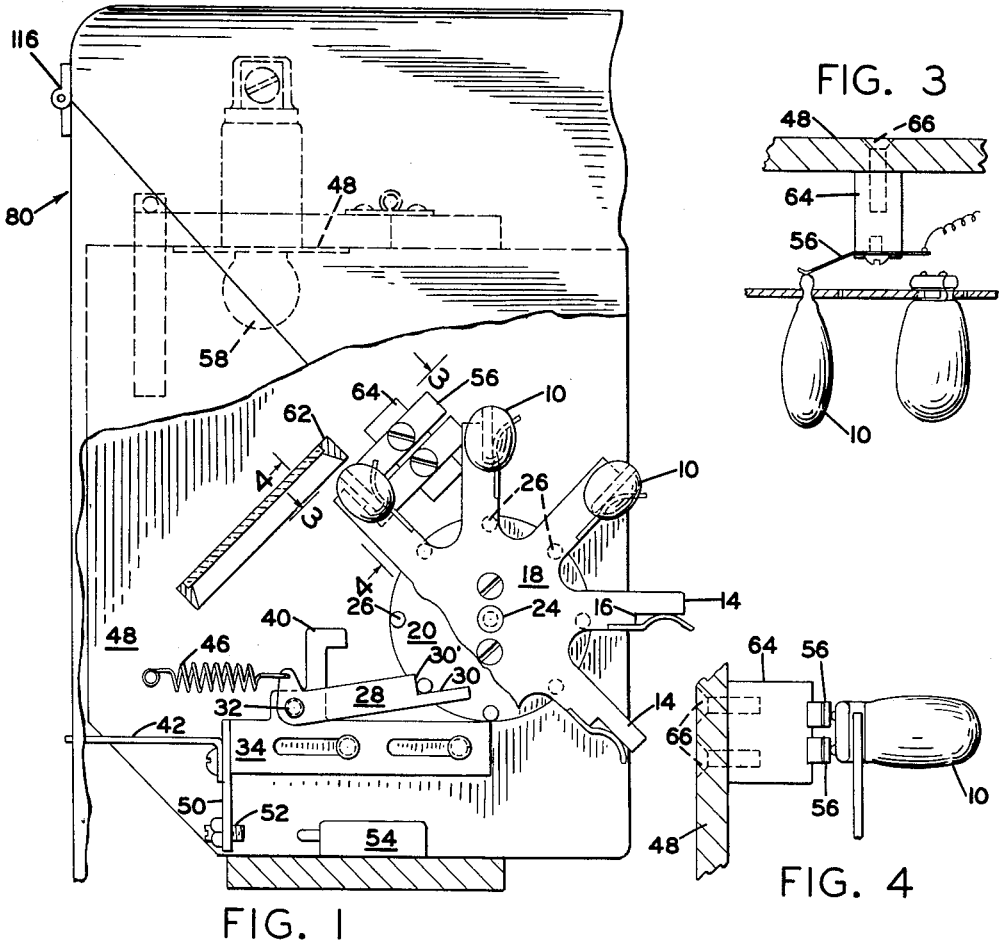
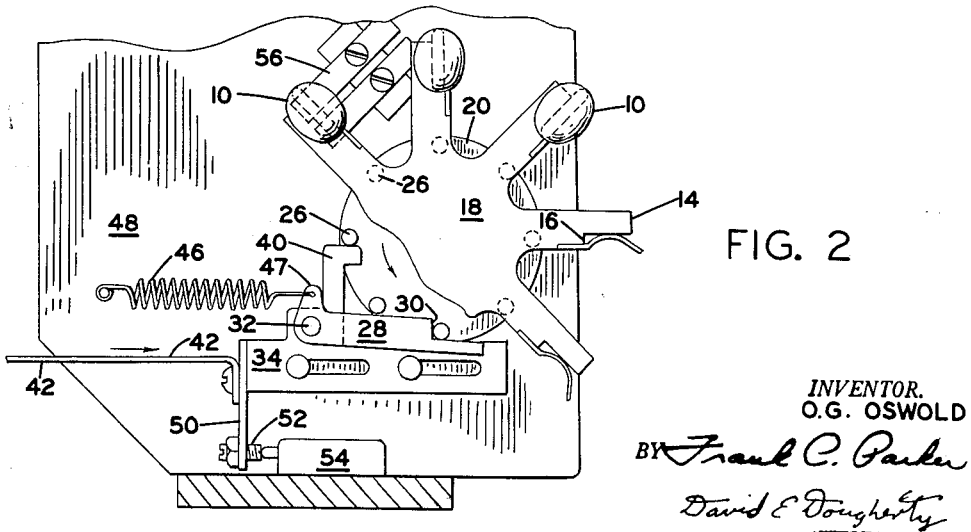
INVENTOR.
O. G. OSWOLD
BY Frank C. Parker
David E. Dougherty
ATTORNEYS April 30, 1963  O. G. OSWOLD  3,087,318
MULTIFLASH DEVICE Filed Feb 13, 1961  2 Sheets-Sheet 2

INVENTOR.
O.G. OSWOLD
BY Frank C. Parker
David E. Dougherty
ATTORNEYS

United States Patent Office 3,087,318
Patented Apr. 30, 1963

3,087,318
MULTIFLASH DEVICE
Oluf G. Oswold, Canadice, N.Y., assignor to Bausch & Lomb Incorporated, Rochester, N.Y., a corporation of New York
Filed Feb. 13, 1961, Ser. No. 88,813
1 Claim. (Cl. 67—31)

This invention relates to a novel multiflash device, and more particularly, to a novel multiflash device for use in a retinal camera or the like.

The demand of the ophthalmic profession for convenient, rapid repetitive operation of retinal cameras has led to the wide use of so-called strobe flash devices. Retinal cameras, however, generally require relatively high intensity illumination, and the strobe units that provide sfficient illumination for this use are bulky and relatively expensive. Notwithstanding the expense, the strobe units have been preferred because of their convenience, there being no need to change bulbs, and their capability of a relatively rapid repetitive rate.

The present invention provides an inexpensive indexing type holder for holding a plurality of incandescent type flash bulbs, and automatically firing them as they are successively indexed into a firing position. The overall cost is relatively low, thus compensating to a large degree for the small inconvenience of bulb changing.

The multiflash device of the present invention is particularly advantageous for use with retinal cameras and the like. The device provides means for holding a plurality of flash bulbs, for indexing them sucessively into a firing position, and for firing them as they arrive in the firing position. Continuous, relatively low intensity illumination is also provided for aiming and focusing. The arrangement is relatively simple, compact, and inexpensive. The flash bulbs may be easily and quickly loaded into and unloaded from the device. They may be fired in rapid order, if desired, and positive mechanical means are provided to insure proper positioning of each bulb at the time it is fired.

FIG. 1 is a longitudinal section view of the flash holder showing the holder in one operative position;

FIG. 2 is a fragmentary view generally similar to the view of FIG. 1 but showing the holder in a second operative position;

FIG. 3 is a fragmentary horizontal sectional view taken along the line 3—3 of FIG. 1;

FIG. 4 is a fragmentary cross sectional view taken along the line 4—4 of FIG. 1.

Figure 5:
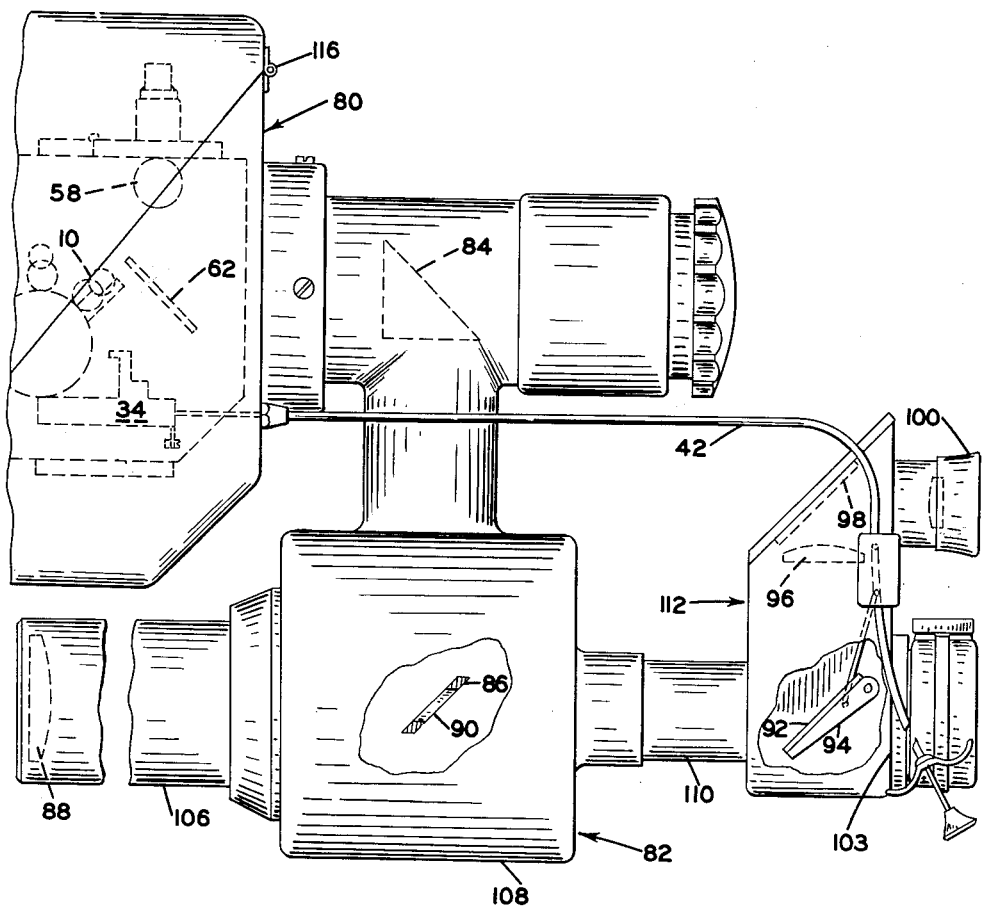
FIG. 5 is a side elevational view of the apparatus of the invention as arranged for use with a retinal camera.

Briefly, the multiflash device according to the present invention utilizes incandescent flash bulbs held in spring clips at the ends of radial arms of an indexible wheel. The wheel is indexed by a pawl, which carries a detent for positively positioning the wheel at the end of each advance. The bulbs are fired as they successively arrive at the firing position. The pawl and a switch for firing the bulbs are actuated by a single actuator.

In the multi-flash holder shown in the drawings, eight miniature photoflash lamps 10 of commercial design may be spring held at the outer ends of respective radially projecting arms 14 of an indexible wheel 18. The lamps 10 are positioned against outwardly facing shoulders 16 formed near the outer ends of the arms 14.

The indexible wheel 18 is fixed to a shaft 24 which is journalled in the housing 48. A drive disc 20 is also fixed to the shaft 24 for rotating it. Angularly spaced pins 26 project axially from the drive disc 20 near the outer periphery thereof for engagement by a portion 30 of the pawl 28.

The pawl 28 is pivoted on a slide bar 34, which is pin-in-slot mounted on the housing 48. The slide bar 34 carries a detent extension 40, which is positioned relative to the pawl 28 for interference with one of the pins 26 following the one engaged by the pawl 28, thereby providing a positive stop to hold the wheel positively in position at the end of each indexing step.

The slide bar 34 is drivable in the forward direction by a Bowden wire 42, or other desired means, and is spring biased in the reverse direction by a tension spring 46, which is connected between the housing 48 and the pawl 28. The spring 46 is secured to an ear 47 which projects from the rear of the pawl 28 above a pivot 32. The spring thus serves the dual purpose of retracting the slide bar when the Bowden wire is released and also of pivoting the pawl upwardly to engage the next succeeding pin 26 as the pawl is retracted.

An arm 50 is fixed to the slide bar 34 and carries an adjustable switch actuator 52. The actuator 52 actuates a switch 54 to complete the electrical circuit and fire the lamp 10 when the pawl 28 and detent 40 lock the indexible wheel 18 in firing position.

The operation of the flash holder will be described in conjunction with FIGS. 1 and 2. In FIG. 1, the device is shown in its ready position preparatory to actuation. The slide bar 34 is held to the left by the spring 46. The spring 46 also biases the pawl 28 upwardly, holding it in engagement with the pin 26. As the Bowden wire 42 moves the slide bar 34 to the right, a shoulder 30' pushes the pin 26, thus rotating the drive disc 20 and the indexible wheel 18 in a counterclockwise direction.

When the indexing wheel 18 is rotated through a predetermined angular distance, thereby bringing the next successive photoflash lamp 10 into position for firing, the second succeeding pin 26 engages the detent 40 and prevents further rotation of the indexible wheel 18 and drive disc 20.

The rotation of the indexible wheel 18 brings the base of the photoflash lamp 10 into contact with a pair of flexible electrical brushes 56 as the bulb 10 is brought into the firing position. The brushes 56 are connected in series with the switch 54 for firing the bulb 10 when the switch 54 is actuated by the actuator 52. Tolerances in the indexing wheel, angular movement and switch actuator are not critical. The relatively large area of illumination produced by firing an incandescent flash bulb overcomes to a high degree the need for critical tolerances.

The top portion of the casing is mounted on a hinge 116 so that it may be readily opened for convenience in changing the flash lamps 10.

A continuously energized lamp 58 is mounted in the top of the housing 48 for providing illumination for aiming and focusing purposes. Light from the lamp 58 is directed along the output axis of the flash holder by a beam splitter 62, which may be a plane piece of uncoated glass. The beam splitter 62 is positioned on the output axis at a 45° angle thereto, and transmits light from the flash bulbs 10 when they are fired.

FIG. 5 shows a retinal camera which incorporates a multiflash unit according to the present invention. An illumination system 80 is shown in the upper portion of the drawing and is attached to a retinal camera designated 82.

Light from the photoflash bulb 10 is reflected by a prism 84 onto an annular reflector 86. The annular reflector 86 reflects the light rays along the optical axis of the retinal camera 82 and through an objective lens 88 for illuminating the field of interest such as the fundus of an eye.

Imaging light rays pass through the objective lens 88, through the aperture of the annular reflector 90, which serves also as a stop in the camera, and are focused on a film plane 103. A reflex mirror 92 is mounted on a pivot 94 to reflect the imaging rays through an objective lens 96 onto an inclined mirror 98 and to an eyepiece assembly 100. The reflex mirror 92 is moved out of the ray path by the initial movement of the Bowden wire 42, which actuates the flashholder.

The operable parts of the retinal camera 82 described above are mounted in a casing, which comprises a front tubular section 106, a central housing 108 and a rear tubular section 110. The rear section 110 carries a housing 112 for the reflex assembly, eyepiece and film magazine. The central housing 108 carries the annular mirror 90, and has the front and rear tubular sections 106 and 110 as well as the illumination system 80 mounted thereon. The forward tubular section 106 carries the objective lens 88.

Additional advantages provided by the multi-flash device include the fact that tolerances are not critical because of the relatively large area of the light sources. Furthermore, the use of commercially available miniature bulbs such as the GE-AG1 provides illumination having an effective duration of about .020 second with a peak intensity of 400,000 lumens. This makes it possible to open the camera shutter prior to firing the flashbulb, and to use the bulb for the exposure timing, thereby avoiding the need to synchronize the shutter and flash.

What is claimed is:

A multiflash device for use in a retinal camera comprising an indexible wheel including radially extending arms, said arms including outwardly facing shoulders and spring clips for releasably holding flashbulbs individually on the ends of said arms, a drive disc coaxially mounted and operatively connected to said indexible wheel and a movable pawl, angularly spaced pins mounted on said drive disc, said pawl engaging said pins for rotating said indexible wheel upon movement of said pawl, a movable detent and a common member, said detent carried by said common member and said pawl pivotally mounted on said common member for translation together, spring means biasing said member in a first direction and means overcoming said bias and driving said common member in the opposite direction, said detent being aligned with and adapted to engage one of said pins upon the translational movement of said detent for stopping said wheel at the end of a predetermined advance, electrical circuit means including a normally open switch for firing the bulbs as they successively reach the end of said predetermined advance, and an actuator carried by said common member and aligned with said switch and moving into contact with and closing said switch to thereby complete the electrical circuit at approximately the time said detent stops said wheel.

References Cited in the file of this patent

UNITED STATES PATENTS

| | | |
|---|---|---|
| 2,097,250 | Keith | Oct. 26, 1937 |
| 2,839,667 | Cannella | June 17, 1958 |
| 2,892,073 | Michatek et al. | June 23, 1959 |